(12) United States Patent
Messing et al.

(10) Patent No.: US 11,614,071 B2
(45) Date of Patent: Mar. 28, 2023

(54) METHOD FOR OPERATING A WIND TURBINE, WIND TURBINE AND WIND PARK

(71) Applicant: Wobben Properties GmbH, Aurich (DE)

(72) Inventors: Ralf Messing, Aurich (DE); Carl Michael Schwarz, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/131,107

(22) Filed: Dec. 22, 2020

(65) Prior Publication Data

US 2021/0190038 A1    Jun. 24, 2021

(30) Foreign Application Priority Data

Dec. 23, 2019  (DE) .......................... 102019135754.3

(51) Int. Cl.
*F03D 7/02* (2006.01)
*F03D 17/00* (2016.01)

(52) U.S. Cl.
CPC .......... *F03D 7/0224* (2013.01); *F03D 17/00* (2016.05); *F05B 2270/328* (2013.01); *F05B 2270/341* (2020.08)

(58) Field of Classification Search
CPC ...... F03D 7/0224; F03D 17/00; F03D 7/0256; F03D 7/0276; F03D 7/0296; F03D 7/048; F05B 2270/328; F05B 2270/341; F05B 2270/304; F05B 2270/32; Y02E 10/72
See application file for complete search history.

(56) References Cited

U.S. PATENT DOCUMENTS

| | | | |
|---|---|---|---|
| 11,125,215 B2 * | 9/2021 | Enevoldsen | ............ F03D 17/00 |
| 2010/0021296 A1 | 1/2010 | Nielsen | |
| 2010/0098540 A1 * | 4/2010 | Fric | ......... F03D 7/043 |
| | | | 416/1 |
| 2014/0112780 A1 | 4/2014 | Herrig et al. | |
| 2018/0223803 A1 * | 8/2018 | Zheng | ..................... F03D 7/026 |

FOREIGN PATENT DOCUMENTS

WO    2018/145715 A1    8/2018

\* cited by examiner

*Primary Examiner* — Joseph Ortega
(74) *Attorney, Agent, or Firm* — Seed Intellectual Property Law Group LLP (57) ABSTRACT

Provided is a method for operating a wind turbine, an associated wind turbine and a wind park. The method comprises a) providing an indicator for the occurrence of a flow separation on a pressure side of a rotor blade of a rotor of the wind turbine, and b) changing an operational management of the wind turbine using the indicator, wherein the indicator comprises a pitch angle of the rotor blade. By using the pitch angle as an indicator, a flow separation on the pressure side of the rotor blade can be effectively prevented.

17 Claims, 5 Drawing Sheets

METHOD FOR OPERATING A WIND TURBINE, WIND TURBINE AND WIND PARK

BACKGROUND

Technical Field

The present invention concerns a method for operating a wind turbine, an associated wind turbine and a wind park.

Description of the Related Art

Wind turbines are known which extract energy from the wind using an aerodynamic rotor with at least one rotor blade, and convert it into electrical energy. The electrical energy is then for example fed into an electrical supply network.

In this context, it is known that because of requirements of network operators of the electrical supply networks, only a reduced infeed power of the wind turbine is requested or required in order to prevent an overload of the power networks.

According to the prior art, in this case the rotation speed is reduced along an operating curve of an optimized power operating mode, in particular a rotation speed-power curve, until the desired or required reduced nominal power output is reached. This then necessarily means that reduced power operating modes always have lower nominal rotation speeds than the optimized power operating mode.

The nominal power output is achieved at the so-called nominal wind speed, and it is evident that the nominal wind speed is lower for the reduced power operating mode than for the optimized power mode. At wind speeds above the nominal wind speed, the installation reduces the rotation speed to the nominal rotation speed $N_{soll}$ for example by pitching the rotor blades independently of wind speed. In an exemplary storm mode which begins above a predefined wind speed, the installation reduces the speed to a rotation speed which is wind-speed-dependent and, in storm mode, falls from the nominal rotation speed to a free-spin rotation speed.

It is known that with decreasing power implementation at the rotor blade and increasing wind speeds, the angle of attack on the rotor blade is distributed such that the angles of attack in the inner blade region increase relative to normal operation, and the angles of attack in the outer blade region decrease. In restricted operation, an ever smaller proportion of the kinetic energy of the wind—which increases with wind speed—has to be converted into the rotational energy of the rotor blades.

At high wind speeds and low rated power levels, the drive moment is only generated at the inner blade, while at the outer blade no power or only little power is converted. Thus at the outer blade, in absolute terms the (negative) angles of attack may be so large that there is a danger of flow separation on the pressure side.

This pressure-side flow separation may develop very suddenly as soon as the angles of attack fall below certain limits. A significant noise development and in some cases aero-elastic instabilities may occur; both are phenomena which must be absolutely avoided.

The aim is therefore to operate the installation so that no flow separation occurs on the pressure side of the rotor blade profile, also known as negative stall. Whether there are profile sections in the rotor blade in which there is a risk of negative stall in turbine operation at reduced rated outputs and higher wind speeds, depends firstly naturally on the characteristic properties of the rotor blade profiles used and secondly on the rotor blade design. Thus for example the use of a so-called back twist considerably increases the risk of negative stall at restricted operating points. Back twist means a clear rise in rotor blade twist, which—depending on the design procedure—may be up to around 7°, on the last 5% of the rotor blade towards the rotor blade tip. This design procedure is often preferred for reducing the installation loads. The load relief on the blade tip region then necessarily leads to greatly reduced angles of attack in the blade tip region, and in restricted operating mode leads to the undesirable occurrence of negative stall. The rotor blade developer is therefore limited in his design flexibility, and in some cases may only use load-reducing measures such as back twist within restrictions. Alternatively, the installation would have to be shut down prematurely in restricted mode, which again unacceptably reduces the availability of the turbines in high wind scenarios.

BRIEF SUMMARY

Provided is a wind turbine and an associated method for operating a wind turbine which guarantee a calm and aerodynamically stable operation, in particular with reduced rated output.

According to one aspect, a method is proposed for operating a wind turbine comprising: a) providing an indicator for the occurrence of a flow separation on a pressure side of a rotor blade of a rotor of the wind turbine, and b) changing an operational management of the wind turbine using the indicator, wherein the indicator comprises a pitch angle of the rotor blade.

The disclosure serves, in operation of the wind turbine, to avoid operating states with flow separation on the pressure side of a rotor blade profile. This flow separation may lead to aero-elastic phenomena which result in rotor blade vibrations, which in turn may lead to increased system loads. Furthermore, the disclosure serves to avoid excessively high sound emissions in strong wind/storm operation of the installation.

It is therefore proposed to establish an indicator which reliably identifies, in good time, the risk of negative stall in order to initiate where necessary measures to further reduce this risk, such as for example modified operational management. Since the flow separation on the pressure side can occur very suddenly and the associated negative effects develop very directly, it is all the more important to use an indicator which can be clearly detected in order to initiate precisely planned measures.

It is evident to use the wind speed as an indicator for the incipient flow separation, and the wind speed is actually also used in the prior art to control the system in storm control mode. The wind speed may for example be determined using an anemometer arranged on the nacelle, and from simulations it is known at which wind speed critical negative angles of attack arise at the rotor blade. The problem with this procedure however is that wind speed measurement at the nacelle anemometer does not precisely define the wind speed in the free contact flow. The wind speed at the anemometer must be corrected for the power extraction in the rotor plane situated upstream of the nacelle anemometer. This correction function is amongst others a function of the wind speed, the rotor rotation speed and the pitch angle. Since there are a plurality of restricted operating modes, and the network operators sometimes require a functionality of stepless speed control, in practice it is almost impossible to determine the correction functions with the necessary precision.

In this context, the operating point is a specific point in the map or on the curve of the wind turbine which is applied because of system properties and the effective external influences and parameters. For example, the operating point may comprise a turbine rotation speed, a generated electrical power, a pitch angle and similar. The operational management is here in particular the implementation of the control or regulation system for setting the operating point.

Preferably, the pitch angle is measured or determined, in particular determined by a set position of a pitch adjuster. Usually, the pitch angle in a wind turbine is already present as a measurement variable and accordingly need not be determined by other methods in a complex and/or error-subject fashion, like for example the wind speed.

By using the pitch angle as an indicator, a flow separation on the pressure side of the rotor blade can be effectively prevented.

In a preferred embodiment, for several operating points of the wind turbine, in particular for several rotation speeds of the wind turbine, a critical value of the indicator is provided at which the occurrence of flow separation on the pressure side begins, and the method furthermore comprises comparing a current indicator value with a critical indicator value for the current operating point, wherein the step of changing the operational management takes place as soon as a difference between the indicator value and the critical indicator value falls below a predefined safety value.

Therefore the pitch angle is proposed as the indicator and trigger criterion for control strategies for avoiding the occurrence of negative stall. The control strategies which lead to a change in the operating point of the wind turbine are applied in particular at high speeds in the full-load region such as, for example but not exclusively, a rotation speed increase in reduced power mode, or storm control. The pitch angle is already present in the system as a measurement variable, and the critical pitch angle at which critical angles of attack are reached can be determined very precisely in advance with uncomplicated simulation methods. When a critical pitch angle is reached, a modified operational management may be implemented in order, e.g., to further reduce the risk of negative stall.

The critical values of the indicator are therefore preferably provided in tabular form or as a function in the system controller of the wind turbine. The values can be determined by experiment or—more simply—by simulation, for example using the critical angle of attack, in particular in the outer blade region. Between the tabular values, interpolation for example may take place. As an alternative to interpolation, it is also possible that the lower value of the indicator is always used as the critical value. Thus the safety margin for avoiding negative stall is further increased.

The safety value may one example be "0". In this example, the provided critical indicator value preferably already has a safety interval from the value at which flow separation actually begins. Quite generally, it is found that by using the pitch angle, a very precise prediction of the occurrence of negative stall can be made, so that the safety value may be smaller in comparison with other methods.

The safety value may be identical at all operating points or may depend on further factors. For example, it is advantageous if the safety value depends on a current turbulence intensity. In this case, it is advantageous if a greater turbulence intensity leads to a greater safety value. Thus even in very turbulent wind conditions, operation is possible without the occurrence of negative stall. Alternatively or additionally, further parameters may also be taken into account.

Preferably, the critical values of the indicator are determined on the basis of a distribution of angle of attack of the rotor blades and a critical angle of attack.

The critical angle of attack at which flow separation occurs on the pressure side depends on the profile and position of the profile along the rotor blade longitudinal axis. For example, the critical angle of attack may lie in a region below 0°, such as for example −8°. Also, the critical angle of attack is dependent on further factors such as for example the surface composition or a soiling state of the rotor blade. The person skilled in the art is familiar with determination of both a critical angle of attack and the influences on the critical angle of attack by experiment and simulation. Insofar as in this context we refer to angles of attack, preferably the effective angles of attack are relevant.

Preferably, the critical indicator value corresponds to a critical pitch angle. Accordingly, if the pitch angle is kept below the critical indicator value, the occurrence of flow separation on the pressure side can be avoided.

Preferably, the critical indicator value diminishes as the rotation speed of the rotor increases.

According to the disclosure, it has been found that an increase in rotation speed leads to a greater tolerance of the effective angle of attack with respect to changing wind speeds, so that only a significantly higher wind speed leads to critical angles of attack which then trigger flow separations on the pressure side.

By implication, the pitch angle must be kept to a lower value, and the critical indicator value is therefore lower than at a lower rotation speed. This is advantageous in particular in reduced power mode since there the rotation speed usually lies below the nominal rotation speed for optimized power mode, so that here loads and noise can be reduced by increasing the rotation speed.

Preferably, the critical indicator value is established independently of a level of reduced nominal power in a restricted operating mode, and/or rises as the degree of restriction increases.

Here it has been found that the degree of restriction has only a secondary influence on the critical value of the indicator. For example, the difference between an optimized power mode and an operating mode restricted to a few percent of nominal output, i.e., very greatly restricted, lies in the region of a few degrees, so in practice this consideration can be neglected.

In this case, preferably the critical value of the indicator is used for the greatly restricted mode, since this lies in a few degrees below the value for optimized power mode, and hence allows operation in all stages of power restriction without flow separation on the pressure side.

Preferably, the critical indicator value is provided as a function of a profile surface state of the rotor blade, in particular a soiling.

Preferably, the indicator indicates the occurrence of the flow separation in an outer region (e.g., outer region 118 in FIG. 1) of the rotor blade, in particular in an outer region which lies more than 70% of the rotor radius, in particular more than 90% of the rotor radius, away from a center of the rotor. In this region, the occurrence of flow separation on the pressure side is firstly particularly frequent and secondly the highest loads are associated therewith in this region.

Preferably, the wind turbine is operated with reduced nominal power level in a reduced power mode.

Because in such a mode the rotation speed usually lies below the nominal rotation speed for optimized power mode, the method may here reduce the loads and noise, for example by increasing the rotation speed. Also in reduced power mode as a whole, the risk of negative stall is higher because of the typically higher pitch angles.

Preferably, the step of changing the operational management comprises increasing the rotation speed.

Increasing the rotation speed in particular allows the critical angle of attack to be shifted towards higher wind speeds. This prevents or at least delays an undesirable shut-down of the wind turbine.

Preferably, the step of changing the operational management is implemented as a control strategy.

The control strategy may either be active in every operating point and monitor the indicator, i.e., in particular the pitch angle. Alternatively, it is conceivable that the control strategy is activated only at a minimum wind speed and/or minimum rotation speed. In this way, the control system as a whole may be simplified since fewer parameters must be monitored continuously. In these regions, use of the wind speed as an indicator is particularly imprecise.

The method thus allows an effective avoidance of the occurrence of negative stall independently of wind measurement. Since the pitch angle can be measured precisely or is present in the system as a determined variable, monitoring the pitch angle as an indicator allows very precise determination of whether or not there is a risk of flow separation on the pressure side (e.g., pressure side 112 in FIG. 1).

In a further aspect, a wind turbine is proposed with an aerodynamic rotor which can be operated with a rotation speed. The aerodynamic rotor comprises at least one rotor blade with a longitudinal axis, the rotor blade comprising a pressure side and a suction side (e.g., suction side 120 in FIG. 1) opposite the pressure side, and a pitch adjuster (e.g., pitch adjuster 114 in FIG. 1) for rotational movement of the rotor blade about the longitudinal axis for setting a pitch angle; indicator circuitry which provides a critical value of an indicator for the onset of a flow separation on the pressure side of the rotor blade, wherein the indicator comprises the pitch angle; a controller (e.g., controller 122 in FIG. 1) which is configured to control the operating point of the wind turbine such that the indicator remains below the critical value of the indicator which is provided by the indicator circuitry.

Preferably, the controller is designed to control the pitch angle such that the critical value of the indicator is not exceeded.

Preferably, the indicator circuitry is configured to provide the critical value of the indicator as a function of a rotation speed of the rotor, wherein the controller is designed to control the pitch angle and/or the rotation speed of the wind turbine such that the critical value of the indicator is not exceeded.

Preferably, the wind turbine furthermore comprises restriction circuitry for operating the wind turbine in a reduced power mode with reduced nominal power level, wherein the controller is designed to increase the rotation speed in a reduced power mode such that the indicator remains below the critical value of the indicator which is provided by the indicator circuitry.

The wind turbine, in particular its controller, can advantageously be combined with all embodiments of the method described as preferable.

In a further aspect, a wind park (e.g., wind park 124 in FIG. 1) is proposed with at least one wind turbine according to the invention.

BRIEF DESCRIPTION OF THE SEVERAL VIEWS OF THE DRAWINGS

Further advantages and particular embodiments are described below with reference to the appended figures. The drawings show.

DETAILED DESCRIPTION

Figure 1:
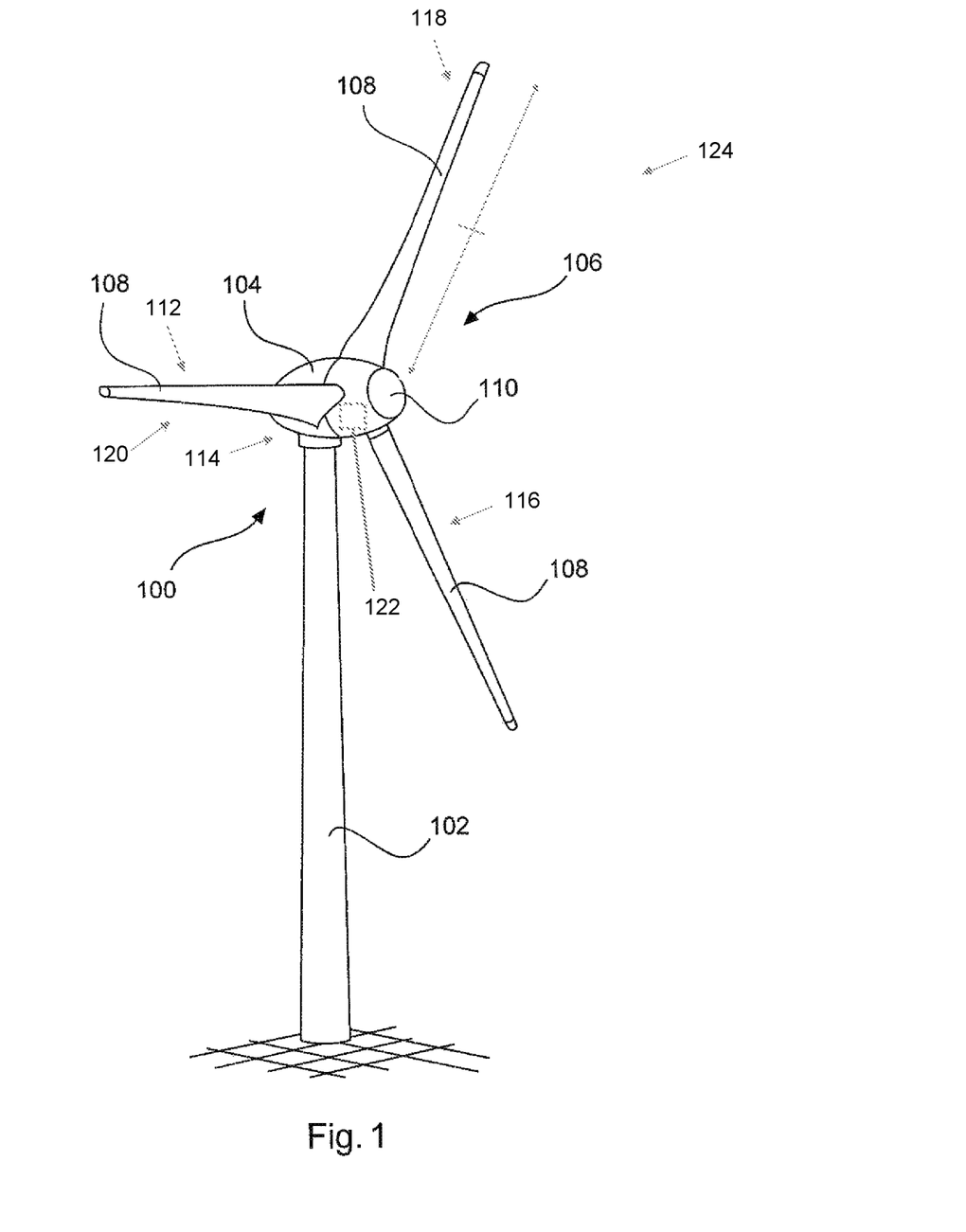
FIG. 1 schematically as an example, a wind turbine.

FIG. 1 shows a diagrammatic depiction of a wind turbine according to the invention. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is set in a rotational movement by the wind during operation of the wind turbine, and thus also turns an electrodynamic rotor of a generator which is coupled directly or indirectly to the aerodynamic rotor 106. The electrical generator is arranged in the nacelle 104 and generates electrical energy. The pitch angle of the rotor blades 108 may be changed by pitch motors at the rotor blade roots of the respective rotor blades 108.

Figure 2:
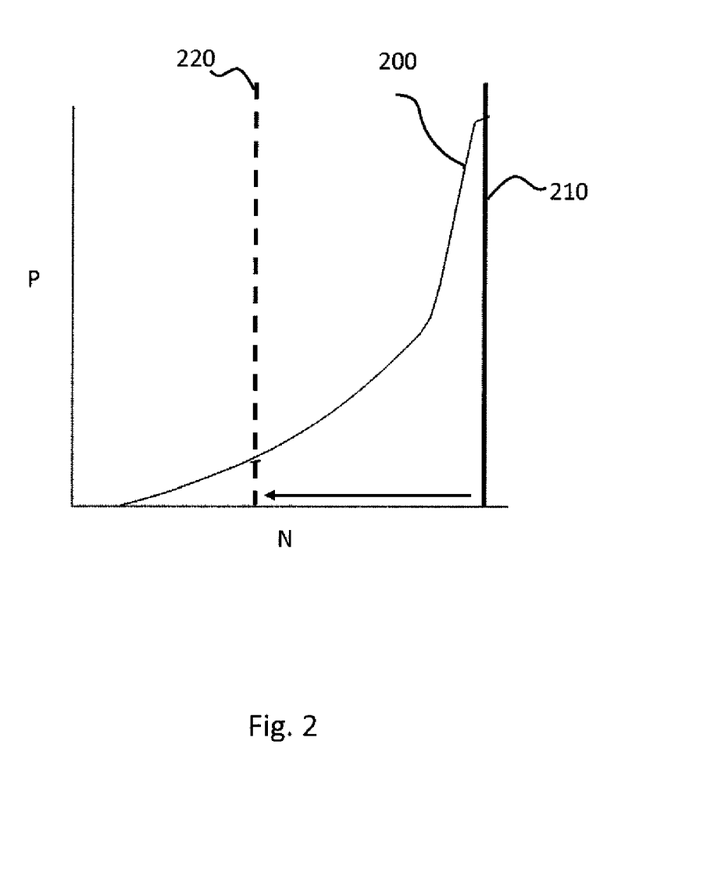
FIG. 2 schematically as an example, a rotation speed—power curve.

FIG. 2 shows schematically as an example a curve 200, which shows in exemplary fashion a correlation between a rotation speed N on the horizontal axis and a generated electrical power P on the vertical axis, wherein other curves are also possible. Reduced power operating modes were developed in order to meet the requirements of network operators who, e.g., in high wind situations, require only a reduced infeed power from wind turbines 100 or wind parks in order to prevent overload of the power networks. According to the prior art, on an operating curve of an optimized power mode, such as for example curve 200, the rotation speed is reduced until the reduced nominal power level is reached. This necessarily means that reduced power operating modes always have lower nominal rotation speeds than the optimized power mode. FIG. 2 shows schematically examples of operating curves (BKL) of an optimized power operating mode 210, and a reduced power mode 220 for the region until reaching the rated output.

Figure 3:
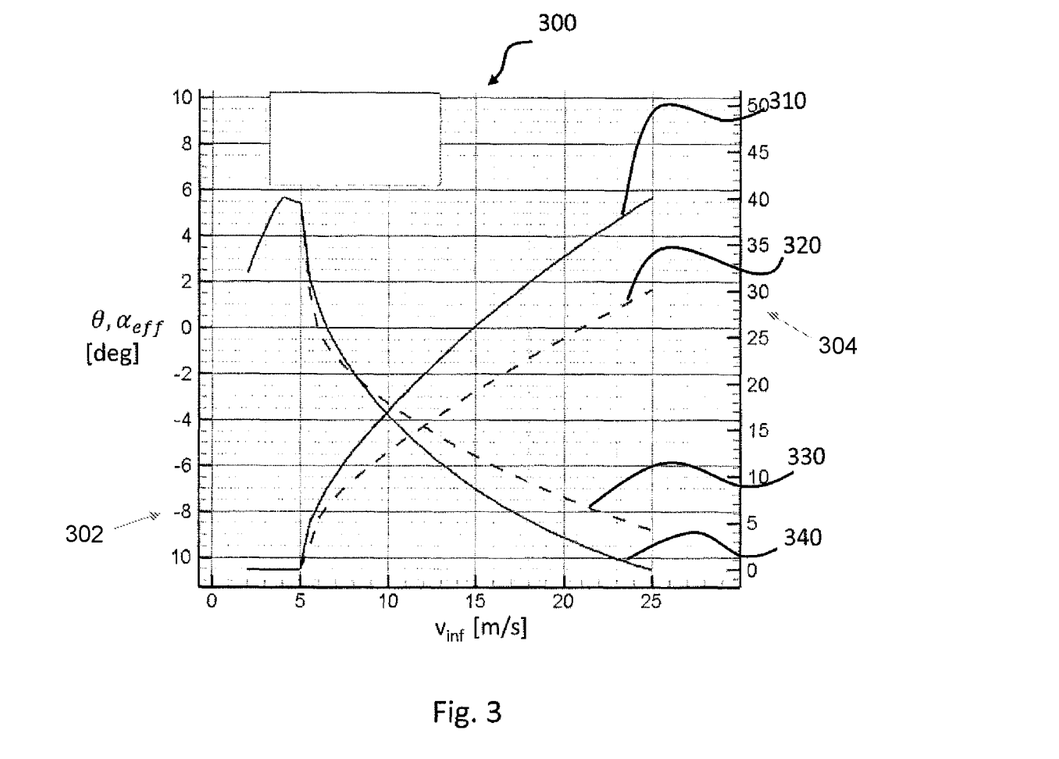
FIG. 3 schematically as an example, a diagram of the pitch angle and angle of attack over the wind speed.

FIG. 3 shows schematically as an example a diagram 300 of an effective angle of attack $\alpha_{eff}$ and a pitch angle $\theta$ on the vertical axis for various free wind speeds $v_{inf}$ on the horizontal axis. The effective angles of attack 330, 340 are shown as an example on a rotor blade section at 90% of the rotor blade length, since at this point there is a high risk of occurrence of negative stall. The corresponding pitch angles are shown as lines 310, 320.

The exemplary scale for the effective angle of attack $\alpha_{eff}$ is shown on the left-hand side of the diagram 300, and that for the pitch angle $\theta$ on the right-hand side of the diagram 300. The same applies to the further FIGS. 4 and 5.

The diagram 300 is based on a reduced rated power of around 15% of the nominal output of the installation for two different rotation speeds. The solid lines 310 and 340 indicate the conditions at the rotation speed provided according to the prior art for these restricted operating modes, wherein the rotation speed is around 65% of the nominal rotation speed $N_{soll}$ at nominal power. The dotted lines 320 and 313 show the conditions if the rotation speed were increased to $N_{soll}$ for the operating mode restricted to 15% of nominal power.

The whole of FIG. 3 therefore refers to restricted mode. Whereas lines 310 for pitch angle θ and 340 for the resulting effective angle of attack $\alpha_{eff}$ correspond to the conditions at reduced operating speed, wherein the reduced operating speed is in conformity with the usual procedure for power reduction in restricted mode, the rotation speed is increased for the dotted lines 320 and 330 to a value which substantially corresponds to the nominal rotation speed $N_{soll}$ at nominal power.

The information content of this diagram will be explained with reference to some concrete numerical examples. Initially, let us assume that the critical angle of attack 302 for the occurrence of negative stall at this blade section is −8°. According to the operational management of the prior art, then the critical angle of attack of −8° would be reached at a wind speed of for example v=17 m/s. Over a wide range of wind speeds, above the trigger speed of for example v=5 m/s, the effective angle of attack $\alpha_{eff}$ diminishes monotonously as the wind speed rises.

Without further measures, now, i.e., on reaching the critical effective angle of attack $\alpha_{eff}$, the installation would have to be shut down or at least the rotation speed N further reduced if the occurrence of negative stall leads to undesirable phenomena, such as noise increase or load increases caused by aero-elastic instabilities.

The associated critical pitch angle 304 in this case is for example around 29°. If the rotation speed is raised for example to $N_{soll}$, the critical angle of attack of −8° is only reached above 22 m/s, i.e., at higher wind speeds. This is indicated in that the dotted line 330 only reaches a specific value of the angle of attack at a higher wind speed, i.e., further to the right in the drawing, than the solid line 340 for the reduced rotation speed.

The amount of increase in the wind speed, at which the critical angle of attack is reached after increasing the rotation speed, depends on the profile used at this blade section. If the critical angle of attack is for example −9°, the critical wind speed rises from 19.5 m/s to >25 m/s, i.e., in some cases in a region of storm control in which the rotation speed and power are reduced. If the critical angle of attack is just −4°, the critical wind speed rises marginally from 10 m/s to slightly over 11 m/s, so measures such as shut-down are only slightly delayed.

If we return to the original assumption of a critical angle of attack of −8° and assume a still constant wind speed, it is clear from FIG. 3 that by increasing the rotation speed, the angle of attack is increased from −8° to around −6.5° and hence moves away from the negative stall. The pitch angle is reduced for example from 29° to around 22°, as shown by a comparison of lines 310 and 320.

Until the angle of attack at increased rotation speed $N_{soll}$ and 22 m/s again reaches the critical mark of −8°, the pitch angle rises to around 27°, i.e., the critical pitch angle diminishes slightly as the rotation speed increases, in this numerical example from 29° to 27°. The critical pitch angle is thus preferably at least a function of the rotation speed. The dependency on the power level of the restricted mode will be clarified below.

Figure 4:
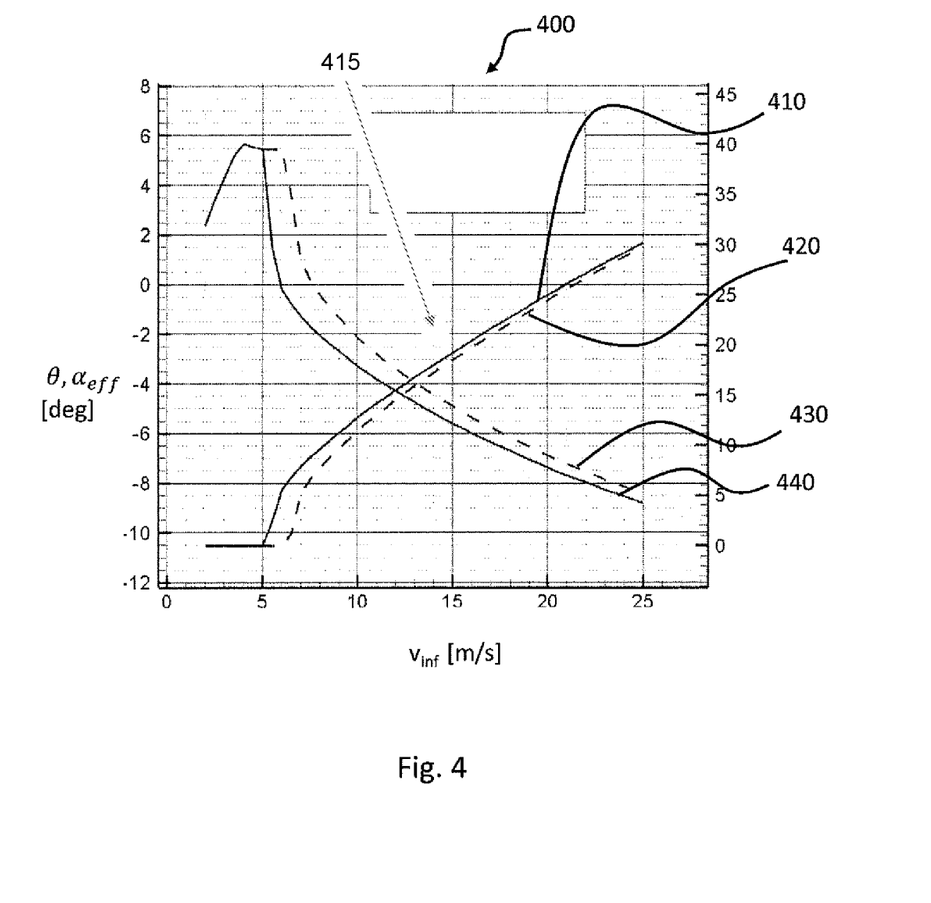
FIG. 4 schematically as an example, a further diagram.

FIG. 4 shows a diagram 400 which has the same axes as the diagram 300 in FIG. 3. The pitch angle and angle of attack at the rotor blade section at 90% radius are shown for two operating modes, which are restricted to 15% and 25% of rated output, with a rotation speed increase to the nominal rotation speed $N_{soll}$. Lines 410 and 420 accordingly correspond to the pitch angle development with operation restricted to 15% and 25% of the nominal power. Lines 430 and 440 show accordingly the development of the effective angle of attack, wherein the solid lines 410, 440 refer to operation reduced to 15% of rated output, and dotted lines 420, 430 refer to operation reduced to 25% of rated output.

In the case of the 15% mode, with the exemplary assumption of the critical angle of attack of −8°, negative stall is reached at a wind speed of 22 m/s and a pitch angle of 27°. In the case of the 25% mode, these values are around 23.5 m/s and a pitch angle of 28°. From this example, it is clear that the critical pitch angle, as an indicator 415 of negative stall in reduced power operating modes, is dependent on the respective power level. If the differences in practical cases are considered slight, the lower of the two critical pitch angles may be used for both modes, which simplifies the control system.

A further uncertainty in using the pitch angle as an indicator is the modified profile properties due to soiling. Firstly, the angle of attack at which negative stall occurs may change. In many practical cases, this change is very small so that a single stall limit may be defined for various degrees of profile soiling. Secondly, a changed pitch control results for the modified profile properties.

Figure 5:
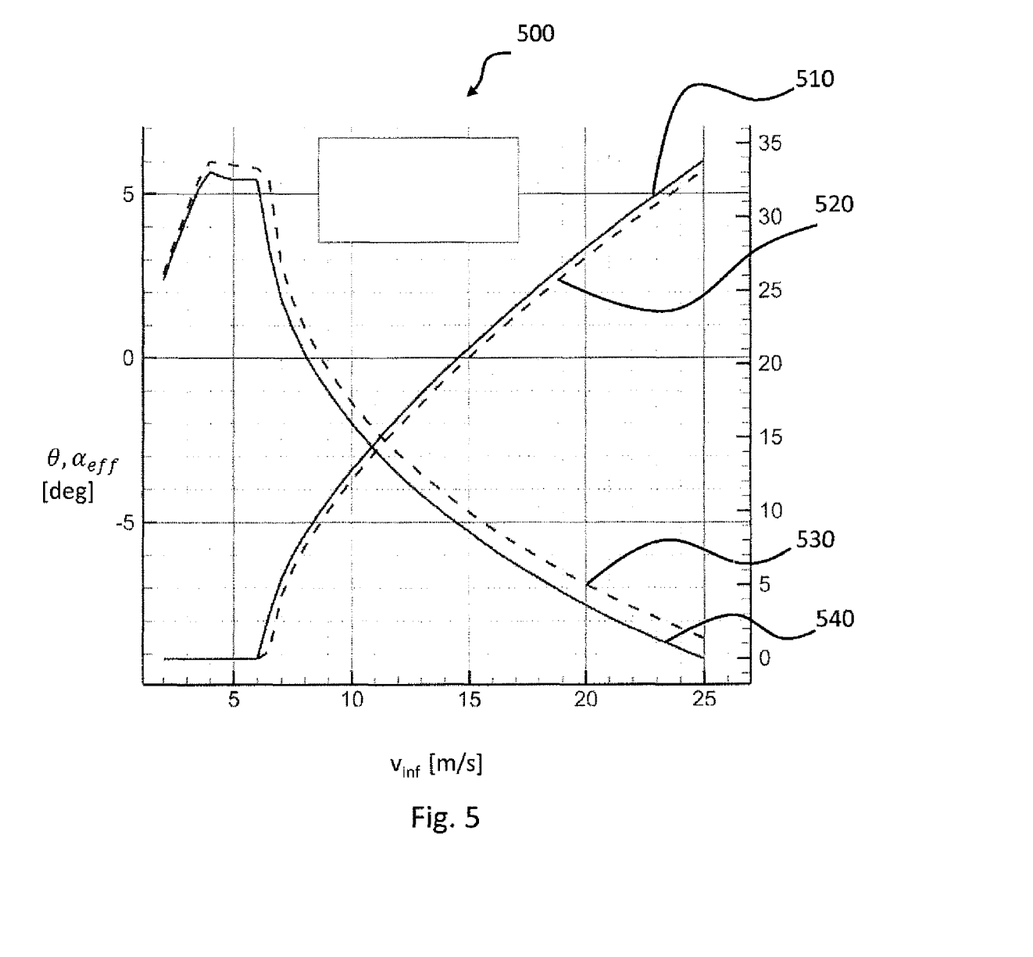
FIG. 5 schematically as an example, a further diagram.

FIG. 5 shows a diagram 500 which has the same axes as diagram 300 in FIG. 3. Lines 510 and 520 correspond to a development of pitch angle over wind speed for operation reduced to around 25% of rated output, while lines 530 and 540 show the associated effective angles of attack. The solid lines 510 and 540 belong to a clean profile, and lines 520 and 530 to a soiled profile.

It is clear from FIG. 5 that the critical angle of attack of −8° for clean flow profiles is reached at around 21.5 m/s wind speed and 29.5° pitch angle. For soiled profiles (tripped), these values change to 23.5 m/s and 31°. The difference between 29.5° and 31° can in practice again be ignored since the lower of the two pitch angles can be defined as critical for both cases.

If in addition we assume a shift in the stall limit, i.e., the critical angle of attack, from −8° to −7° due to the soiling of the profiles, the value pair for negative stall then changes to 27.5° pitch at 20 m/s. The critical pitch angle in this case could be established at 27.5° independently of profile property.

The clean blade would then trigger a corresponding control strategy such as speed increase at a wind speed of around 20 m/s instead of 21.5 m/s. It is accordingly preferred that the profile surface (e.g., profile surface 116 in FIG. 1) states such as soiling are taken into account in the choice of definition of critical pitch angle. It is however possible that in practice it is sufficient to define one pitch angle for all profile states.

The invention may be applied to all pitch-controlled, variable speed wind turbines which are able to detect the pitch angle.

The invention claimed is:

1. A method, comprising:
   operating a wind turbine, the operating comprising:
   providing an indicator for an occurrence of a flow separation on a pressure side of a rotor blade of a rotor of the wind turbine; and
   changing an operational management of the wind turbine based on the indicator,
   wherein the indicator includes a pitch angle of the rotor blade,
   wherein the wind turbine is operated with reduced nominal power level in a reduced power mode, and wherein changing the operational management comprises increasing a rotational speed of the rotor.

2. The method according to claim 1, wherein the pitch angle is measured or determined based on a set position of a pitch adjuster.

3. The method according to claim 1, wherein for a plurality of operating points of the wind turbine, a critical value of the indicator is provided at which the occurrence of flow separation on the pressure side begins, the method further comprising:
   comparing a current indicator value with the critical value of the indicator for the current operating point, wherein changing the operational management takes place when a difference between the current indicator value and the critical value of the indicator falls below a predefined safety value.

4. The method according to claim 3, wherein the plurality of operating points of the wind turbine is a plurality of rotational speeds of the wind turbine.

5. The method according to claim 3, wherein the critical value of the indicator is determined based on a distribution of angles of attack of the rotor blade and a critical angle of attack.

6. The method according to claim 3, wherein the critical value of the indicator corresponds to a critical pitch angle.

7. The method according to claim 3, wherein the critical value of the indicator diminishes as a rotational speed of the rotor increases.

8. The method according to claim 3, wherein the critical value of the indicator is established independently of a level of reduced nominal power in a restricted operating mode or rises as a degree of restriction increases or both.

9. The method according to claim 3, wherein the critical value of the indicator is a function of a profile surface state of the rotor blade.

10. The method according to claim 9, wherein the profile surface state of the rotor blade is soiling.

11. The method according to claim 1, wherein the indicator indicates an occurrence of the flow separation in an outer region of the rotor blade.

12. The method according to claim 11, wherein the outer region lies more than 70% of the rotor radius away from a center of the rotor.

13. The method according to claim 1, wherein changing the operational management is implemented as a control strategy.

14. A wind turbine comprising:
   an aerodynamic rotor configured to be operated with a rotation speed,
   a rotor blade coupled to the aerodynamic rotor, the rotor blade having a longitudinal axis and comprising:
      a pressure side and a suction side opposite the pressure side,
      a pitch adjuster for rotational movement of the rotor blade about the longitudinal axis for setting a pitch angle, and
   a controller configured to:
      provide a critical value indicator for an onset of a flow separation on the pressure side of the rotor blade, wherein the indicator includes the pitch angle,
      control an operating point of the wind turbine such that the indicator remains below the critical value indicator,
      operate the wind turbine in a reduced power mode with reduced nominal power level, and
      increase the rotation speed in a reduced power mode such that the indicator remains below the critical value indicator.

15. The wind turbine according to claim 14, wherein the controller is configured to control the pitch angle such that the critical value indicator is not exceeded.

16. The wind turbine according to claim 14, wherein the controller is configured to:
   provide the critical value indicator as a function of a rotation speed of the rotor, and
   control the pitch angle or the rotation speed or both such that the critical value indicator is not exceeded.

17. A wind park comprising at least one wind turbine according to claim 14.

* * * * *